United States Patent Office 3,000,206
Patented Sept. 19, 1961

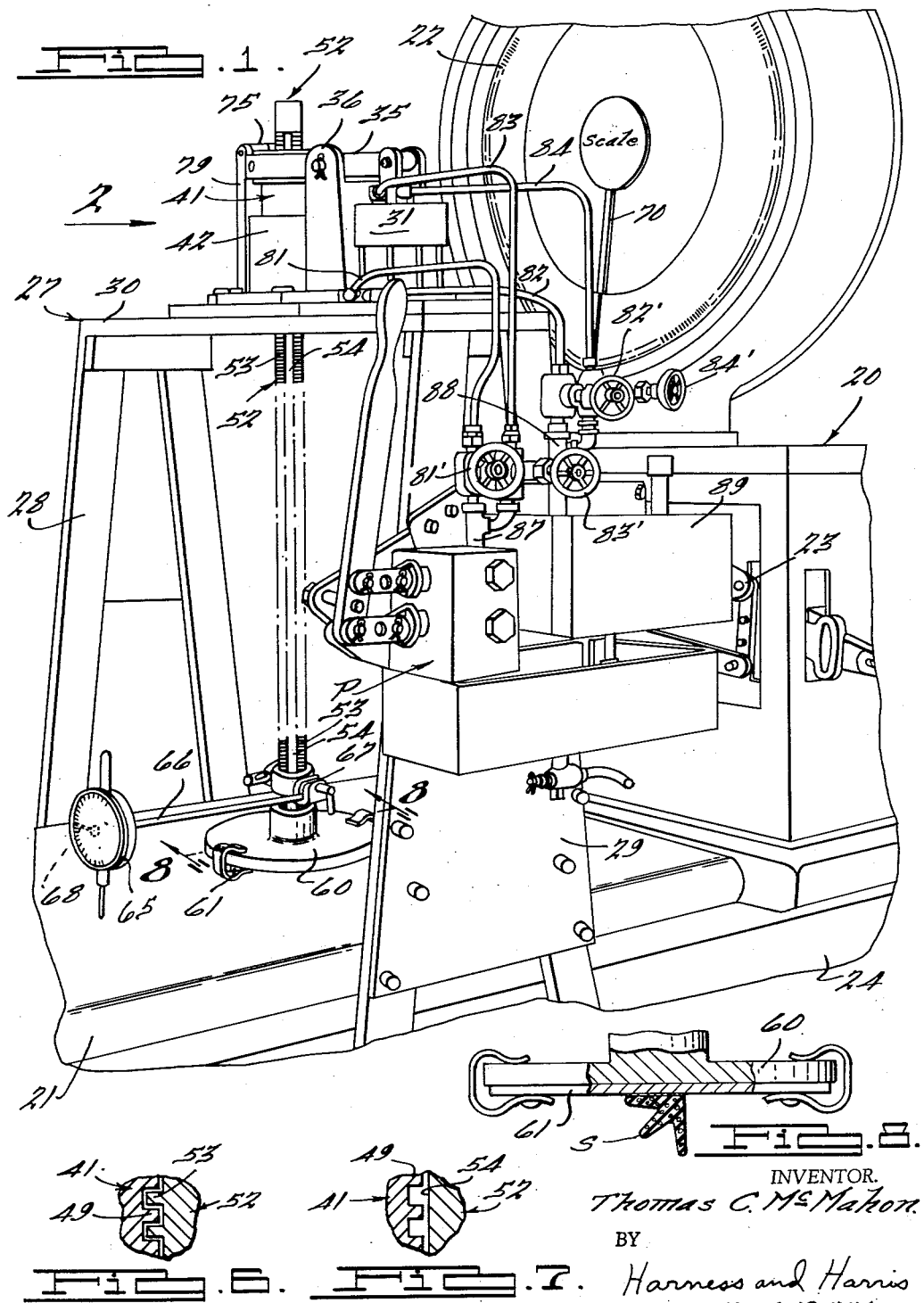

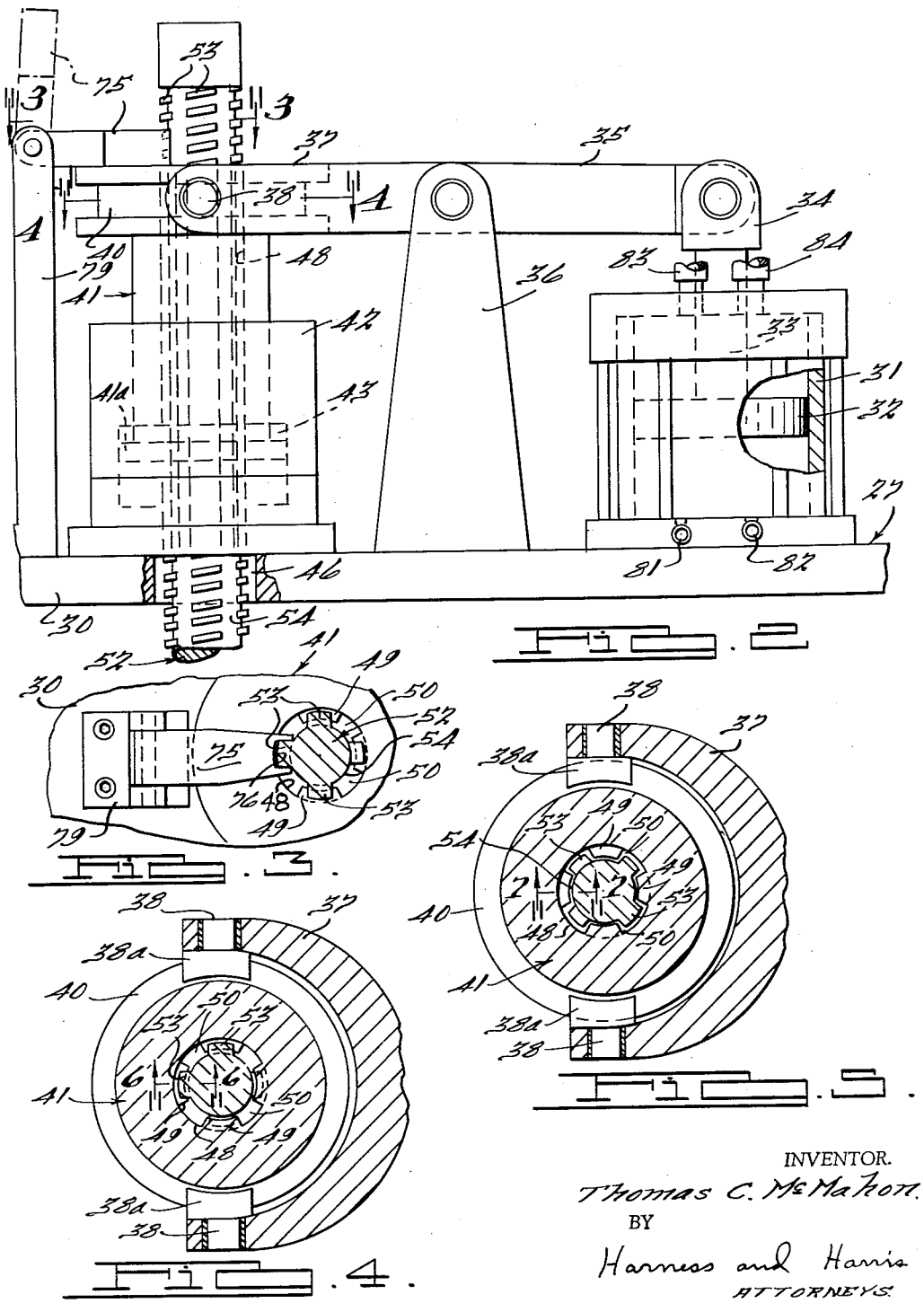

3,000,206
LOAD-DEFLECTION TESTING MACHINE
Thomas C. McMahon, Windsor, Ontario, Canada, assignor to Chrysler Corporation of Canada, Limited, Windsor, Ontario, Canada
Filed Dec. 16, 1957, Ser. No. 703,087
11 Claims. (Cl. 73—94)

This invention relates to a load-deflection testing machine and particularly to such a machine wherein a pressure fluid operated motor is utilized to apply the loads to the test sample.

It is a primary object of this machine to provide a pressure fluid operated load-deflection testing machine having means for readily and quickly applying a constant, accurately measured and recorded test load that may be maintained for any desired period of time or readily released and reapplied.

It is still another object of this invention to provide a load-deflection testing machine having an axially slotted, toothed, load applying shaft that is adjustably mounted in a supporting yoke in such a manner that it may be quickly and easily adjusted between its extreme limits by a simple manual operation and then locked in adjusted position so that fluid power may be readily applied thereto to actuate the shaft.

It is still another object of this invention to provide a load-deflection testing machine that has an improved form of yoke-supported load applying mechanism that can be readily applied to a conventional test scale to convert the test scale to an improved type of load-deflection test machine.

It is a further object of this invention to provide a load-deflection test machine for compression loading of resilient articles of varying sizes and shapes which machine can be readily and accurately operated by a single operator with the greatest of speed.

It is still another object of this invention to provide a load-deflection test machine that is extremely accurate, easy to operate, sturdy, subject to minimum wear and misadjustment, and extremely versatile for general laboratory use.

It is still another object of this invention to provide an all-purpose load-deflection test machine that is simple to operate, extremely accurate in its results, requires a minimum of operators, and produces the desired results in the minimum time.

It is still another object of this invention to provide an improved type of pressure fluid operated actuating means for load-deflection testing machines.

Other objects and advantages of this invention will become readily apparent from a reading of the following description and a consideration of the related drawings wherein:

FIG. 1 is a fragmentary perspective view of the load applying portion of the load-deflection testing machine embodying this invention;

FIG. 2 is a fragmentary elevational view, partly in section, of the load shaft supporting yoke of the test machine shown in FIG. 1, the view being taken looking in the direction of the arrow 2 of FIG. 1;

FIG. 3 is a fragmentary sectional elevational view taken along the line 3—3 of FIG. 2;

FIG. 4 is another fragmentary sectional elevational view taken along the line 4—4 of FIG. 2, showing the load applying shaft connected to the floating sleeve of the piston operated pivot arm;

FIG. 5 is another elevational view, similar to FIG. 4, but showing the load applying shaft disconnected from the floating sleeve of the piston operated pivot arm;

FIG. 6 is a fragmentary sectional elevational view taken along the line 6—6 of FIG. 4;

FIG. 7 is a fragmentary sectional elevational view taken along the line 7—7 of FIG. 5; and FIG. 8 is a sectional elevational view taken along the line 8—8 of FIG. 1.

In load-deflection testing machines of the type heretofore used to compression load resilient samples it has been conventional to use a worm and screw gear mechanism to raise and lower the load shaft and its pressure plate and to apply the load to the test sample. The wear in such screw mechanisms introduces inaccuracies in the test results, changing between tests on large size and small size samples with such machines requires considerable time, and, due to friction in the screw gearing, it is difficult to evenly apply an increasing or decreasing load to the test sample. The load-deflection test machine to be hereafter described overcomes each of the aforenoted disadvantages and provides an improved type of machine that is extremely versatile for general laboratory use. Furthermore, this load-deflection test machine utilizes a conventional type of balance scale in combination with a novel type of load applying mechanism so the machine is inexpensive, readily operable by the average laboratory technician and the accuracy of the machine is equal to that of the tried and tested scale that forms a basic part of the machine.

FIG. 1 of the drawings shows a platform scale 20 that includes a vertically movable load supporting platform 21, a load recording dial 22, load counterbalance mechanism 23, and a supporting base 24. This platform scale 20 is a conventional unit and accordingly further description thereof is thought to be unnecessary.

Rigidly mounted on the scale base 24 so as to span the central portion of the scale platform 21 is an inverted U-shaped yoke structure 27. The yoke structure 27 includes the spaced apart vertical legs 28, 29 that are connected at their upper ends by the rigid top plate 30. Mounted on the yoke top plate 30 is the load applying mechanism that will now be described in detail.

Considering first FIG. 2, it will be noted that on the right side of the yoke top plate 30 there is mounted a fluid tight cylinder 31 within which is mounted for vertical reciprocation a double acting piston 32. Piston 32 has a piston rod 33 projecting upwardly from its top side which is connected by a pin and clevis 34 to one end of a pivot arm 35. Pivot arm 35 is pivotally supported at about its mid-length on a fulcrum support 36. Fulcrum 36 is rigidly mounted on the yoke top plate 30. The end of pivot arm 35 opposite the clevis pin connection 34 is bifurcated to provide a semi-circular fork portion 37 (See FIGS. 4 and 5). The fork legs each carry pivot pins 38 that have integral finger portions 38a projecting inwardly therefrom. The finger portions 38a of the fork pins 38 are slidably mounted in a peripheral groove 40 at the upper end of the floating sleeve 41.

The floating sleeve 41 is reciprocably mounted for vertical movement in a guide cylinder 42 that is rigidly mounted on the top of the yoke to plate 30. Guide cylinder 42 has a central bore therethrough that slidably receives the sleeve 41 and this bore is enlarged at its bottom end to provide a shouldered bore 43 that limits the vertical movement of the flange 41a on the lower end of the sleeve 41.

From FIG. 2 it will be noted that the guide cylinder 42 is concentrically mounted above and around a bore 46 that pierces the yoke top plate 30. This bore 46 is aligned with an internally threaded bore 48 through the floating sleeve 41 (See FIGS. 3–5). It will be noted that the internal threads 49 on the bore 48 through the floating sleeve 41 are not continuous threads but rather four sets of circumferentially spaced apart threads 49 that are separated by axially extending grooves or slots 50. The purpose of the spaced grooves and threads will become readily apparent from the subsequent description.

Arranged to be selectively engaged with and disengaged from the threads on the floating sleeve 41 is a threaded load applying shaft 52. Load applying shaft 52 has a threaded construction that mates with the threaded construction on the bore of the sleeve 41. It will be noted that shaft 52 has four circumferentially spaced sets of threads 53 that are spaced by axially extending grooves 54.

From a consideration of FIGS. 3–5 it is thought to be obvious that if the shaft 52 is rotated to the position shown in FIGS. 3 and 4 then the teeth 53 of shaft 52 will be engaged with the teeth 49 of the floating sleeve 41 and thus the shaft 52 is positively connected to the sleeve 41 of the pivot arm fork 37. Likewise, if the shaft 52 should be rotated approximately forty-five degrees (45°) from its FIG. 3 position, the shaft 52 will then be in the FIG. 4 position where the shaft teeth 53 are positioned in the grooves 50 between the teeth 49 of the sleeve 41. Under such circumstances the load applying shaft 52 is disconnected from the sleeve 41 and shaft 52 can be moved freely upwardly or downwardly relative to the pivot arm fork 37. Because of the simple one-eighth (⅛) turn engage-disengage connection between the shaft 52 and the sleeve 41 it is thought to be obvious that the shaft and its attached pressure plate 60 (FIG. 1) can be readily adjusted to permit the positioning of various size test samples between the shaft pressure plate 60 and the scale platform 21 (FIG. 1).

While the groove and tooth construction 49, 50 of sleeve 41 and 53, 54 of the shaft 52 provides for a simple, fast adjustment for the height of the load shaft 52, still, when the desired shaft adjustment has been attained a means is provided to maintain the selected shaft adjustment. This means is a pivoted lever 75 (FIGS. 2 and 3) that has notch 76 in its free end. During adjustment of the shaft 52, the latching lever 75 is pivoted upwardly to the broken line position shown in FIG. 2. At this time the shaft 52 can be freely rotated to engage and disengage its teeth 53 with the teeth 49 of the sleeve 41. When the desired shaft adjustment has been attained the lever 75 is pivoted downwardly from its broken line position to its full line horizontal position in FIG. 2. When lever 75 is in the horizontal position its notched end 76 receves one of the sets of shaft teeth 53 as clearly shown in FIG. 3. Notched lever 76 will now prevent rotation of shaft 52 but it will not interfere with vertical movement of the shaft 52. Pivoted latching lever 75 is mounted on a support leg 79 carried by the yoke top plate 30.

Pressure plate 60 (FIG. 1) is a flat disc on the lower end of shaft 52 that has detachably connected to its underside a sample plate 61 (See FIG. 8). The test sample S (FIG. 8) is bonded or otherwise fixed to the underside of the sample plate 61 and then the plate 61 is attached to the underside of the pressure plate 60. After the sample S is mounted on the pressure plate 60 the scale counterweight mechanism 23 is adjusted to offset the weight of the sample so that scale dial pointer 70 reads zero. Next shaft 52 is lowered so that the sample S is engaged with the scale platform 21. The resilient sample S will then be compressed against platform 21 and the acting compressive load can be read from the scale dial 22.

While the load applied to the resilient sample S is being applied it is also important to be able to note the corresponding deflection of the test sample S under its compressive load. To measure the deflection of the test sample S a deflection gauge 65, mounted on a support rod 66, is clamped to the lower end of the load shaft 52 by a screw clamp 67. In operation after the deflection gauge 65 is attached to the load shaft 52 the pressure plate 60 is lowered until the test sample S on the underside of plate 60 engages the scale platform 21 so as to put a one pound preload on the sample S throughout its total length. With the one pound preload on the sample S, the deflection gauge dial pointer 68 is set to zero. The load-deflection machine is now ready to be operated to test the sample S. To run a test sufficient load is usually applied to the sample S so as to cause a predetermined compression of the sample S, such as .125 inch (⅛″) and then the corresponding load is read from the scale dial 22.

Heretofore the mechanism for supporting and adjusting the load applying shaft 52 has been described. Now the actuating means for the load applying shaft will be described. As previously pointed out a cylinder 31 with a double acting piston 32 therein is mounted on the yoke top plate 30. Connected to the lower end of the bore of cylinder 31 are a pair of fluid conduits 81, 82. Connected to the top of the bore of cylinder 31 are another pair of conduits 83 and 84. Each of the four fluid conduits 81–84 has a control valve 81′–84′ respectively so that fluid flow through the several conduits can be accurately controlled. Conduits 81 and 83 (see FIG. 1) are connected to the discharge line 87 of the double piston pressure fluid pump P, which in the instance shown is a hand operated unit mounted on the yoke side leg 29. However, some other type of pump such as an electric motor driven pump with solenoid valve control could be used. Conduits 82 and 84 are connected to the drain conduit 88 that empties into the sump tank 89. Sump tank 89 is connected by conduit means, not shown, to the inlet port of the pump P so that the fluid of the system can be continuously recirculated.

To briefly review the operation of this load-deflection machine the first step is to mount the plate 61 and its test sample S on the pressure plate 60 while the pressure plate 60 is held in an elevated position above the scale platform 21. Next, the shaft 52 is rotated about ⅛ turn to disengage the shaft 52 from the sleeve 41 and then the pressure foot 60 can be quickly lowered until the sample S almost touches the scale platform 21. The shaft 52 is then rotated about ⅛ turn to engage its teeth with the teeth 49 of the sleeve 41 to support the shaft at the desired position. Latch 75 is then lowered to a horizontal position to maintain the selected shaft adjustment. Next, with valves 81′–84′ closed, the pump P is operated to develop the necessary pressure in the fluid system. Next leaving discharge valve 82′ closed the discharge valve 84′ is opened. Next supply valve 81′ is opened while supply valve 83′ is kept closed. With this valve arrangement pressure fluid will be admitted to the bore portion of cylinder 31 on the underside of piston 32. The bore portion of cylinder 31 above piston 32 is now empty because it is connected to the sump 89 through the opened discharge valve 84′ so the piston 32 will be moved upwardly by the pressurized fluid admitted to the cylinder lower bore portion. Movement of the piston 32 upwardly will rock pivot arm 35 counterclockwise so that the fork portion 37 moves downwardly and, because of the connection of the pivot arm connected sleeve 41 to the shaft 52, the shaft 52 will be moved downwardly to apply a compression load to the sample S. When the shaft 52 moves downwardly the sample S is loaded and sufficient load can be applied to the sample to accomplish the desired deflection.

Because of the pressurized fluid operation of the shaft 52 by the fluid motor 31, 32, and the valve control of the pressure fluid supply, it is possible to continuously and evenly apply any required force to the shaft 52 so as to compressively load the sample S. Also, in addition to an even force application by the pressure fluid motor any particular force applied can be maintained for an indefinite time or that particular force can be duplicated with ease and certainty.

While this load-deflection machine has been developed primarily for testing the resilient elements that form parts of motor vehicles, still, this machine has application in many other industries and by simple alterations could be used for tension tests as well as compression tests. With a machine of this type available, the engineer can specify a definite load requirement as a property of the resilient part. The compounder of the resilient material can then build the specified property into the resilient compound provided he has adequate test machinery, such as this machine, to test the various samples he compounds.

I claim:

1. A load-deflection machine comprising a platform scale, a rigid yoke structure spanning the scale platform, an internally threaded sleeve floatingly mounted on said yoke structure above the scale platform for limited vertical movement relative thereto, a threaded load applying shaft detachably engaged with said threaded sleeve for alternate conjoint or relative vertical movement with respect thereto, a pressure plate carried by said shaft arranged to deflect a resilient element relative to said scale platform, a pivot arm mounted on said yoke for oscillation about a horizontal axis intermediate its end portions, said pivot arm having one end portion connected to said floating sleeve to cause actuation thereof and the other end portion connected to a pressure fluid operated motor for actuation thereby to cause controlled vertical movement of said floating sleeve.

2. A load-deflection mechanism adapted to be mounted on a platform scale comprising a rigid yoke structure adapted to span the scale platform, a sleeve member floatingly mounted on said yoke structure for limited relative vertical movement with respect thereto, a load applying shaft journaled in the bore of said sleeve and arranged to be adjustably and detachably anchored thereto for alternate conjoint or relative vertical movement, a pivot arm mounted on said yoke structure for oscillation about a horizontal axis, means connecting a first portion of said pivot arm to said floating sleeve to effect vertical movement of the sleeve on oscillation of said pivot arm, a motor mounted on said yoke structure, and means connecting said motor to a second portion of said pivot arm to effect oscillation thereof to cause controlled vertical movement of said floating sleeve.

3. A load-deflection mechanism adapted to be mounted on a platform scale comprising a rigid yoke structure adapted to span the scale platform, a vertically extending sleeve member mounted on said yoke structure for limited relative vertical movement with respect thereto, said sleeve having the bore therethrough formed with a plurality of sets of circumferentially extending, spaced, teeth that have axially extending grooves therebetween, a load applying shaft journaled in the bore of said sleeve, said shaft having a plurality of sets of circumferentially extending, spaced, teeth that have axially extending grooves therebetween, said shaft teeth and sleeve teeth being of mating construction such that relative rotation of the shaft with respect to the sleeve will alternately connect and disconnect the shaft and sleeve for corresponding conjoint or relative vertical movement, means to lock the shaft teeth in engagement with the sleeve teeth, and a motor means mounted on said yoke structure having mechanism connecting the motor to the sleeve to selectively effect reversible vertical movement of said shaft and connected sleeve.

4. A load-deflection mechanism adapted to be mounted on a platform scale comprising a rigid yoke structure adapted to span the scale platform, a vertically extending sleeve member mounted on said yoke structure for limited relative vertical movement with respect thereto, said sleeve having the bore therethrough formed with a plurality of sets of circumferentially extending, spaced, teeth that have axially extending grooves therebetween, a load applying shaft journaled in the bore of said sleeve, said shaft having a plurality of sets of circumferentially extending, spaced, teeth that have axially extending grooves therebetween, said shaft teeth and sleeve teeth being of mating construction such that relative rotation of the shaft with respect to the sleeve will alternately connect and disconnect the shaft and sleeve for corresponding conjoint or relative vertical movement, means to lock the shaft teeth in engagement with the sleeve teeth, and a motor means mounted on said yoke structure having mechanism connecting the motor to the sleeve to selectively effect reversible vertical movement of said sleeve, said shaft and connected motor means comprising a pressure fluid operated motor with valve means to control operation thereof.

5. A load-deflection mechanism adapted to be mounted on a platform scale comprising a rigid yoke structure adapted to span the scale platform, a vertically extending sleeve member mounted on said yoke structure for limited relative vertical movement with respect thereto, said sleeve having the bore therethrough formed with a plurality of sets of circumferentially extending, spaced, teeth that have axially extending grooves therebetween, a load applying shaft journaled in the bore of said sleeve, said shaft having a plurality of sets of circumferentially extending, spaced, teeth that have axially extending grooves therebetween, said shaft teeth and sleeve teeth being of mating construction such that relative rotation of the shaft with respect to the sleeve will alternately connect and disconnect the shaft and sleeve for corresponding conjoint or relative vertical movement, means to lock the shaft teeth in engagement with the sleeve teeth, and a motor means mounted on said yoke structure having mechanism connecting the motor to the sleeve to selectively effect reversible vertical movement of said sleeve, said shaft and connected motor means comprising a pressure fluid operated motor with valve means to control operation thereof, and said mechanism connecting the motor means to the sleeve comprising an oscillatible pivot bar mounted on the yoke structure having a first portion connected to the motor means and a second portion connected to said sleeve.

6. A load-deflection mechanism adapted to be mounted on a platform scale comprising a rigid yoke structure adapted to span the scale platform, a vertically extending sleeve member mounted on said yoke structure for limited relative vertical movement with respect thereto, said sleeve having the bore therethrough formed with a plurality of sets of circumferentially extending, spaced, teeth that have axially extending grooves therebetween, a load applying shaft journalled in the bore of said sleeve, said shaft having a plurality of sets of circumferentially extending, spaced, teeth that have axially extending grooves therebetween, said shaft teeth and sleeve teeth being of mating construction such that relative rotation of the shaft with respect to the sleeve will alternately connect and disconnect the shaft and sleeve for corresponding conjoint or relative vertical movement, and a motor means mounted on said yoke structure having mechanism connecting the motor to the sleeve to selectively effect reversible vertical movement of said shaft and connected sleeve.

7. A load-deflection mechanism adapted to be mounted on a platform scale comprising a rigid yoke structure adapted to span the scale platform, a vertically extending sleeve member mounted on said yoke structure for limited relative vertical movement with respect thereto, said sleeve having the bore therethrough formed with a plurality of sets of circumferentially extending, spaced, teeth that have axially extending grooves therebetween, a load applying shaft journaled in the bore of said sleeve, said shaft having a plurality of sets of circumferentially extending, spaced, teeth that have axially extending grooves therebetween, said shaft teeth an sleeve teeth being of mating construction such that relative rotation of the shaft with respect to the sleeve will alternately connect and disconnect the shaft and sleeve for corresponding conjoint or relative vertical movement, means to lock the shaft teeth in engagement with the sleeve teeth, a motor means mounted on said yoke structure having mechanism connecting the motor to the sleeve to selectively effect reversible vertical movement of said shaft and connected sleeve, and a deflection gauge mounted on said shaft arranged to engage the scale platform during compression of a test sample by said shaft.

8. A load-deflection mechanism adapted to be mounted on a platform scale comprising a rigid yoke structure adapted to span the scale platform, a vertically extending sleeve member mounted on said yoke structure for limited relative vertical movement with respect thereto, said sleeve having the bore therethrough formed with a plurality of sets of circumferentially extending, spaced, teeth that have axially extending grooves therebetween, a load applying shaft journaled in the bore of said sleeve, said shaft having a plurality of sets of circumferentially extending, spaced, teeth that have axially extending grooves therebetween, said shaft teeth and sleeve teeth being of mating construction such that relative rotation of the shaft with respect to the sleeve will alternately connect and disconnect the shaft and sleeve for corresponding conjoint or relative vertical movement, means to lock the shaft teeth in engagement with the sleeve teeth, a motor means mounted on said yoke structure having mechanism connecting the motor to the sleeve to selectively effect reversible vertical movement of said shaft and connected sleeve, and a pressure plate carried by said shaft having a removable test sample support detachably connected thereto.

9. A load-deflection mechanism adapted to be mounted on a platform scale comprising a rigid yoke structure adapted to span the scale platform, a vertically extending sleeve member mounted on said yoke structure for limited relative vertical movement with respect thereto, said sleeve having the bore therethrough formed with a plurality of sets of circumferentially extending, spaced, teeth that have axially extending grooves therebetween, a load applying shaft journaled in the bore of said sleeve, said shaft having a plurality of sets of circumferentially extending, spaced teeth that have axially extending grooves therebetween, said shaft teeth and sleeve teeth being of mating construction such that relative rotation of the shaft with respect to the sleeve will alternately connect and disconnect the shaft and sleeve for corresponding conjoint or relative vertical movement, means to lock the shaft teeth in engagement with the sleeve teeth, and a motor means mounted on said yoke structure having mechanism connecting the motor to the sleeve to selectively effect reversible vertical movement of said sleeve, said shaft and connected motor means comprising a double piston, hand operated pump, a cylinder with a reciprocable piston therein, pressure fluid supply conduits connecting the pump discharge to opposite ends of said motor cylinder, vent conduits connecting the opposite ends of said motor cylinder to a fluid sump, and valve means to control fluid flow through each of said supply and vent conduits.

10. A load-deflection mechanism adapted to be mounted on a platform scale comprising a rigid yoke structure adapted to span the scale platform, a vertically extending sleeve member mounted on said yoke structure for limited relative vertical movement with respect thereto, said sleeve having the bore therethrough formed with a plurality of sets of circumferentially extending, spaced, teeth that have axially extending grooves therebetween, a load applying shaft journaled in the bore of said sleeve, said shaft having a plurality of sets of circumferentially extending, spaced, teeth that have axially extending grooves therebetween, said shaft teeth and sleeve teeth being of mating construction such that relative rotation of the shaft with respect to the sleeve will alternately connect and disconnect the shaft and sleeve for corresponding conjoint or relative vertical movement, means to lock the shaft teeth in engagement with the sleeve teeth, and a motor means mounted on said yoke structure having mechanism connecting the motor to the sleeve to selectively effect reversible vertical movement of said shaft and connected sleeve, said motor means comprising a double piston, hand operated pump, a cylinder with a reciprocable piston therein, pressure fluid supply conduits connecting the pump discharge to opposite ends of said motor cylinder, vent conduits connecting the opposite ends of said motor cylinder to a fluid sump, and valve means to control fluid flow through each of said supply and vent conduits, said mechanism connecting said motor to said sleeve comprising a pivot bar mounted on said yoke structure for oscillation about a horizontal axis and having one end portion connected to said sleeve to effect vertical movement thereof during pivot bar oscillation, the other end portion of said pivot bar being pivotally connected to a rod connected to the motor piston.

11. In a load-deflection machine, a platform scale and a load applying mechanism adapted to be mounted adjacent the platform scale comprising a rigid yoke structure adapted to span the scale platform, a vertically extending sleeve member mounted on said yoke structure for limited relative vertical movement with respect thereto, said sleeve having the bore therethrough formed with a plurality of sets of circumferentially extending, spaced, teeth that have axially extending grooves therebetween, a load applying shaft journalled in the bore of said sleeve, said shaft having a plurality of sets of circumferentially extending, spaced, teeth that have axially extending grooves therebetween, said shaft teeth and sleeve teeth being of mating construction such that relative rotation of the shaft with respect to the sleeve will alternately connect and disconnect the shaft and sleeve for corresponding conjoint or relative vertical movement, and a motor means having mechanism connecting the motor to the sleeve to selectively effect reversible vertical movement of said sleeve and connected shaft.

References Cited in the file of this patent

UNITED STATES PATENTS

| | | |
|---|---|---|
| 898,604 | Rivers | Sept. 15, 1908 |
| 1,887,327 | Readey | Nov. 8, 1932 |
| 2,138,245 | Smith | Nov. 29, 1938 |
| 2,325,026 | Anway | July 27, 1943 |

UNITED STATES PATENT OFFICE
CERTIFICATE OF CORRECTION

Patent No. 3,000,206 September 19, 1961

Thomas C. McMahon

It is hereby certified that error appears in the above numbered patent requiring correction and that the said Letters Patent should read as corrected below.

Column 2, line 59, for "to" read -- top --; column 6, lines 9 and 10, strike out "shaft and connected" and insert the same after "said", first occurrence, in line 9; line 33, strike out "shaft and connected" and insert the same after "said", first occurrence, in same line 33, same column 6; same column 6, line 71, for "an" read -- and --; column 7, line 41, after "spaced" insert a comma; line 51, strike out "shaft and connected" and insert the same before "sleeve" in same line 51, same column 7.

Signed and sealed this 13th day of February 1962.

(SEAL)
Attest:

ERNEST W. SWIDER
Attesting Officer

DAVID L. LADD
Commissioner of Patents